(12) United States Patent
Saeki et al.

(10) Patent No.: US 6,576,714 B2
(45) Date of Patent: Jun. 10, 2003

(54) PRODUCTION PROCESS FOR GLYOXYLIC ACID (SALT)-BASED POLYMER

(75) Inventors: Takuya Saeki, Suita (JP); Akihiko Kanzaki, Suita (JP); Junichi Nakamura, Takatsuki (JP); Yoshikazu Fujii, Suita (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 66 days.

(21) Appl. No.: 09/790,293

(22) Filed: Feb. 22, 2001

(65) Prior Publication Data

US 2001/0020076 A1 Sep. 6, 2001

(30) Foreign Application Priority Data

Feb. 28, 2000 (JP) ........................................ 2000-052606

(51) Int. Cl.$^7$ .............................................. C08F 283/06
(52) U.S. Cl. .................... 525/401; 526/240; 526/317.1; 528/232; 528/250
(58) Field of Search .......................... 525/401; 526/304, 526/240, 317.1; 528/232, 243, 250

(56) References Cited

U.S. PATENT DOCUMENTS

| | | |
|---|---|---|
| 3,875,117 A | 4/1975 | Ackermann et al. |
| 4,144,226 A | 3/1979 | Crutchfield et al. |
| 4,204,052 A | 5/1980 | Crutchfield et al. |
| 4,225,685 A | 9/1980 | Dyroff et al. |
| 4,226,960 A | 10/1980 | Dyroff et al. |
| 4,600,750 A | 7/1986 | Dyroff et al. |
| 5,856,288 A * | 1/1999 | Saeki et al. .................. 252/180 |

FOREIGN PATENT DOCUMENTS

| | | |
|---|---|---|
| DE | 41 06 355 A1 | 9/1992 |
| EP | 0 001 004 A1 | 3/1979 |

* cited by examiner

*Primary Examiner*—Tatyana Zalukaeva
(74) *Attorney, Agent, or Firm*—Haugen Law Firm PLLP

(57) ABSTRACT

The present invention provides a production process for a terminal-end-stabilized glyoxylic acid (salt)-based polymer, which process enables to reduce the amount of the polymerization solvent, as recovered or removed after the end of the polymerization (before the start of the hydrolysis) or after the end of the hydrolysis, without lowering the production efficiency. The production process for a terminal-end-stabilized glyoxylic acid (salt)-based polymer comprises the step of polymerizing a monomer component including a glyoxylic acid ester in order to produce the terminal-end-stabilized glyoxylic acid (salt)-based polymer, wherein a terminal end stabilizer is used as a reaction medium of the polymerization.

4 Claims, No Drawings

PRODUCTION PROCESS FOR GLYOXYLIC ACID (SALT)-BASED POLYMER

BACKGROUND OF THE INVENTION

A. Technical Field

The present invention relates to a production process for a glyoxylic acid (salt)-based polymer. More specifically, the present invention relates to a production process for a terminal-end-stabilized glyoxylic acid (salt)-based polymer.

B. Background Art

A glyoxylic acid (salt)-based polymer has many carboxyl groups in its molecule and therefore displays an excellent function of binding (chelating) the calcium ion or magnesium ion present in water and then dispersing clay and dirt, and further, the glyoxylic acid (salt)-based polymer contains no phosphorus causing environmental pollution such as eutrophication of rivers etc. and is therefore hitherto favorably used as a detergent builder.

As to production processes for the glyoxylic acid (salt)-based polymer, for example, JP-A-052196/1979 and JP-A-050316/1987 (corresponding to U.S. Pat. No. 4,600,750) disclose: a process which comprises the step of polymerizing a glyoxylic acid ester by using a solvent such as an alkanenitrile, a halogenated hydrocarbon, dimethyl sulfoxide, or acetone in order to obtain a glyoxylic acid-based polymer; and a process which comprises the step of further saponifying (hydrolyzing) the glyoxylic acid-based polymer in order to obtain a glyoxylic acid salt-based polymer.

In addition, the glyoxylic acid (salt)-based polymer has unstable terminal end portions because the main chain of this polymer has an acetal structure. Accordingly, in the case where, in order to isolate the glyoxylic acid (salt)-based polymer, a reaction liquid containing the polymer is for example heated to remove a solvent etc. therefrom, the main chain is cut off from the terminal end portions of the polymer, so that the polymer decomposes (depolymerizes). In other words, it is difficult to isolate or purify the glyoxylic acid (salt)-based polymer stably in a high yield. Therefore, a process is disclosed which process comprises the step of stabilizing the terminal end portions of the glyoxylic acid (salt)-based polymer by treating it with a terminal end stabilizer. For example, U.S. Pat. No. 4,144,226, U.S. Pat. No. 4,204,052, U.S. Pat. No. 4,225,685, and U.S. Pat. No. 4,226,960 disclose a process which comprises the step of polymerizing a glyoxylic acid ester by using a solvent such as an alkanenitrile, a halogenated hydrocarbon, dimethyl sulfoxide, or acetone, in which process a terminal end stabilizer is added during or after the polymerization.

However, the above conventional production processes have problems in respect to production efficiency and cost because the polymerization solvent must be recovered or removed after the end of the polymerization (before the start of the hydrolysis) or after the end of the hydrolysis. In addition, in the case where the amount of the polymerization solvent as used is decreased in order to reduce the recovery or removal amount of the polymerization solvent, there are problems in that the viscosity of the polymerization liquid rises to deteriorate the agitation efficiency. Furthermore, an organic solvent such as an alkanenitrile, a halogenated hydrocarbon, dimethyl sulfoxide, or acetone is hitherto used as the polymerization solvent, therefore there might occur problems in respect to safety and environmental pollution resistance if a part of the above solvent remains after the step of recovering or removing it.

SUMMARY OF THE INVENTION

A. Object of the Invention

An object of the present invention is to provide a production process for a terminal-end-stabilized glyoxylic acid (salt)-based polymer, which process enables to reduce the amount of the polymerization solvent, as recovered or removed after the end of the polymerization (before the start of the hydrolysis) or after the end of the hydrolysis, without lowering the production efficiency.

B. Disclosure of the Invention

The present inventors diligently studied to solve the above problems. As a result, they have hit on ideas that: (1) the terminal end stabilizer, which is conventionally added during or after the polymerization in order to stabilize the terminal ends of the glyoxylic acid (salt)-based polymer, can be utilized as a reaction medium of the polymerization; and (2) if the polymerization reaction of a monomer component including a glyoxylic acid ester and the terminal-end-stabilizing reaction can be run by their respective catalysts having different functions, then the terminal end stabilizer serves as a reaction medium without reacting during the polymerization reaction, and can be made to react by adding a terminal-end-stabilizing catalyst into the system after the polymerization. Then, the inventors have completed the present invention by finding that the above problems can be solved by the above ideas.

That is to say, a production process for a terminal-end-stabilized glyoxylic acid (salt)-based polymer, according to the present invention, comprises the step of polymerizing a monomer component including a glyoxylic acid ester in order to produce the terminal-end-stabilized glyoxylic acid (salt)-based polymer, wherein a terminal end stabilizer is used as a reaction medium of the polymerization. Preferably, if the polymerization of the monomer component including the glyoxylic acid ester is carried out as an anionic polymerization, and if a cationically polymerizable one is used as the terminal end stabilizer, then the terminal end stabilizer serves as a reaction medium without reacting until adding an acid catalyst into the polymerization system, and the addition of the acid catalyst then causes the terminal end stabilizer to react with the terminal ends of the glyoxylic acid (salt)-based polymer (as obtained by the anionic polymerization of the monomer component including the glyoxylic acid ester) in order to stabilize the terminal ends of this polymer.

The adoption of this constitution enables to simplify the polymerization solvent recovery or removal step without lowering the production efficiency and to more easily produce the glyoxylic acid (salt)-based polymer.

These and other objects and the advantages of the present invention will be more fully apparent from the following detailed disclosure.

DETAILED DESCRIPTION OF THE INVENTION

Hereinafter, the production process for the terminal-end-stabilized glyoxylic acid (salt)-based polymer, according to the present invention, is explained in detail.

Monomer Component Including Glyoxylic Acid Ester

The monomer component including the glyoxylic acid ester, as used in the present invention production process, is explained at first.

The glyoxylic acid ester, as included in the above monomer component, is represented by general formula (1) below:

$$OHC\text{—}CO\text{—}OR_1 \quad (1)$$

where $R_1$ represents an alkyl group having 1 to 18 carbon atoms, an alkenyl group having 2 to 18 carbon atoms, or an aromatic hydrocarbon group.

For decreasing the steric hindrance during the polymerization, it is more favorable that the above glyoxylic acid ester has an alkyl group having 1 to 4 carbon atom as the substituent which is represented by $R_1$ in the above formula. Specific examples of the glyoxylic acid ester include methyl glyoxylate, ethyl glyoxylate, n-propyl glyoxylate, iso-propyl glyoxylate, n-butyl glyoxylate, isobutyl glyoxylate, sec-butyl glyoxylate, and t-butyl glyoxylate. These glyoxylic acid esters can be used either alone respectively or in combinations with each other. Of the above glyoxylic acid esters, methyl glyoxylate and ethyl glyoxylate are more favorable, and methyl glyoxylate is still more favorable.

The production process for the glyoxylic acid ester is not especially limited. The glyoxylic acid ester can easily be produced, for example, by dehydration of a hemiacetal ester of glyoxylic acid by use of phosphorus pentoxide or sulfuric acid, wherein the hemiacetal ester is obtained by a reaction of glyoxylic acid hydrate and an alcohol.

Incidentally, the glyoxylic acid ester might gradually polymerize even during its storage (preservation) according to storage conditions. Therefore, it is desirable to purify the glyoxylic acid ester by a procedure such as distillation to remove impurities such as polymerized products before use. In other words, it is desirable that the glyoxylic acid ester to be used for the polymerization is as pure as possible. In addition, it is desirable to polymerize the glyoxylic acid ester immediately after its purification.

If necessary, the monomer component may further comprise a monomer (comonomer) which is other than the glyoxylic acid ester and copolymerizable with the glyoxylic acid ester. An anionically copolymerizable comonomer is preferable for controlling the polymerization and the molecular weight. Specific examples thereof include aldehydes having 1 to 20 carbon atoms, such as formaldehyde and acetaldehyde, but are not especially limited. These monomers can be used either alone respectively or in combinations with each other according to demand. Of the above-exemplified monomers, compounds having 1 to 4 carbon atoms are more favorable. It is desirable that the above monomer is as pure as possible, and it is particularly preferable that the contents of acid components and active-hydrogen-containing compounds in the above monomer are low. Therefore, the "glyoxylic acid-based polymer" in the present invention means a homopolymer or copolymer of the glyoxylic acid ester.

When the monomer component further comprises the above other monomer, the content of this monomer is not especially limited, but is favorably in the range of 5 to 0 mol, more favorably 3 to 0 mol, still more favorably 1 to 0 mol, particularly favorably 0.5 to 0 mol, per 1 mol of the glyoxylic acid ester. In the case where the content of the above other monomer exceeds 5 mols, it might be impossible to obtain the glyoxylic acid salt-based polymer which is favorably utilized for the above various uses. In addition, the glyoxylic acid-based polymer, according to the present invention, is particularly preferably a homopolymer of the glyoxylic acid ester.

Terminal End Stabilizer

There is no limitation in respect to the terminal end stabilizer, as used in the production process according to the present invention, if the terminal end stabilizer does not display reactivity during the polymerization of the monomer component including the glyoxylic acid ester. However, a cationically polymerizable one is preferable. Specific examples thereof include: alkyl vinyl ethers, such as ethyl vinyl ether, propyl vinyl ether, and butyl vinyl ether; and epoxides, such as ethylene oxide, propylene oxide, and epichlorohydrin, but are not especially limited. Of these, propylene oxide and ethyl vinyl ether are preferable for displaying the effects of the present invention enough. These terminal end stabilizers can be used either alone respectively or in combinations with each other.

The terminal end stabilizer reacts with the unstabilized (in other words, easily depolymerizable) terminal ends to thereby stabilize them. In one of specific examples, the unstabilized terminal ends of the glyoxylic acid-based polymer are hydroxyl groups (—OH) or alcoholates (—O$^-$), therefore the terminal end stabilizer reacts with these functional groups to thereby prevent the hydrolysis of the glyoxylic acid-based polymer from easily occurring.

Polymerization Reaction

In the production process according to the present invention, the polymerization of the above monomer component including the glyoxylic acid ester is carried out. One of characteristics of the present invention is to use the above terminal end stabilizer as a reaction medium of this polymerization.

The amount of the terminal end stabilizer, used as a polymerization reaction medium in the present invention, may be set according to such as kind thereof or molecular weight of the glyoxylic acid-based polymer, and is not especially limited. However, the amount of the terminal end stabilizer is preferably in the range of 1.1 to 50 in molar ratio to the terminal end portions of the glyoxylic acid-based polymer. In the case where the molar ratio of the terminal-end-stabilizing compound is lower than 1.1, it might be impossible to stabilize the glyoxylic acid-based polymer enough. In addition, in the case where the molar ratio exceeds 50, side reactions other than the addition reaction easily occur because much of the terminal-end-stabilizing compound remains unreacted. In the case where the terminal end stabilizer is an alkylene oxide, there are no especial problems if the glyoxylic acid-based polymer is saponified even though much of the alkylene oxide remains unreacted, because the unreacted alkylene oxide is converted into an alkylene glycol by the saponification.

As is shown above, in the present invention production process for the terminal-end-stabilized glyoxylic acid (salt)-based polymer, the terminal end stabilizer is used as a reaction medium of the polymerization of the monomer component including the glyoxylic acid ester. However, a small amount of organic solvent may be used as a reaction medium together with the terminal end stabilizer. The amount of the organic solvent, which is if necessary included in the reaction medium as used for the polymerization, is favorably in the range of 0 to 20 weight %, more favorably 0 to 10 weight %, still more favorably 0 to 5 weight %. In addition, a mode in which the organic solvent is not used together is particularly preferable for safety and environmental pollution resistance because the organic solvent does not remain. In the case where the ratio of the organic solvent in the reaction medium exceeds 20 weight %, there are disadvantages in that the effects of the present invention cannot be displayed enough.

In addition, in the present invention production process for the terminal-end-stabilized glyoxylic acid (salt)-based polymer, the polymerization concentration of the monomer component including the glyoxylic acid ester is favorably in the range of 20 to 99 weight %, more favorably 40 to 98 weight %, still more favorably 50 to 95 weight %.

Examples of the organic solvent, usable together with the terminal end stabilizer, include: aromatic hydrocarbons, such as benzene, toluene, and xylene; aliphatic hydrocarbons, such as cyclohexane and n-hexane; halogenated hydrocarbons, such as methylene chloride; carboxylic acid esters, such as methyl acetate, ethyl acetate, propyl acetate, butyl acetate, and methyl propionate; ketone compounds, such as acetone; ether compounds, such as tetrahydrofuran and dioxane; alkanenitriles, such as acetonitrile and propionitrile; and dimethyl sulfoxide. Of them, the carboxylic acid esters are particularly favorable.

Incidentally, the above organic solvents are usable together with the terminal end stabilizer, but some organic solvents make it difficult to obtain a glyoxylic acid (salt)-based polymer having a desirable molecular weight when used together with the terminal end stabilizer. Examples of such organic solvents include: alcohols, such as methanol and ethanol; primary amines and secondary amines; carboxylic acids, such as acetic acid; phenols, such as phenol and cresol; and other compounds having an active hydrogen. These can be used as initiators because these serves as initiators of the polymerization. However, in the case where they are used as solvents, it might be difficult to obtain the glyoxylic acid (salt)-based polymer having the desirable molecular weight.

If, as is shown above, the terminal end stabilizer is used as a polymerization reaction medium, even a small amount thereof serves as a reaction medium, and enables to carry out the polymerization while inhibiting the deterioration of the agitation efficiency by suppressing the rise of the viscosity during the polymerization. Therefore, the scale of the solvent recovery or removal process, which is necessary when using a large amount of solvent in conventional production processes for the glyoxylic acid (salt)-based polymer, can be diminished, or the above solvent recovery or removal process becomes unnecessary according to circumstances. Furthermore, when the solvent is conventionally recovered or removed, there is a possibility that the polymer might decompose according to conditions for such as heating treatment in the solvent recovery or removal process. However, the production process according to the present invention can avoid such a possibility. In addition, this production process can be proposed as a production process for a glyoxylic acid (salt)-based polymer which process is very excellent in respect to safety and environmental pollution, because the amount of the organic solvent as conventionally used, such as a halogenated hydrocarbon having high toxicity, can be diminished as much as possible, or because the use of such an organic solvent becomes unnecessary.

In addition, in the present invention production process, more favorably, if the kind of the terminal end stabilizer is selected and if the polymerization reaction of the monomer component including the glyoxylic acid-based monomer and the terminal-end-stabilizing reaction of the produced glyoxylic acid (salt)-based polymer are run by their respective catalysts having different functions, then the terminal end stabilizer serves as a reaction medium without reacting during the polymerization reaction, and can be made to react by adding a terminal-end-stabilizing catalyst into the system after the polymerization. In other words, in the case where the polymerization reaction is carried out by anionic polymerization, a compound which reacts by an acid catalyst is used as the terminal end stabilizer. On the other hand, in the case where the polymerization reaction is carried out by cationic polymerization, a compound which reacts by a basic catalyst is used as the terminal end stabilizer. In a preferable mode, the polymerization reaction is carried out by anionic polymerization, and the terminal end stabilizer is made to react by the acid catalyst.

As to polymerization initiators, anionic-polymerization initiators are preferable for displaying the effects of the present invention enough. Specific examples thereof include: water; alcohols (hydric polymerization initiators), such as methyl alcohol, ethyl alcohol, isopropyl alcohol, and dodecyl alcohol; alkyl glycolates; polyalkylene glycols, polyalkylene glycol monoalkyl ethers; and dialkyl alkyltartronates; but are not especially limited. These polymerization initiators can be used either alone respectively or in combinations with each other. Of the above-exemplified polymerization initiators, methyl alcohol is more favorable. The amount of the polymerization initiator as used may be adjusted according to such as molecular weight of the desired glyoxylic acid-based polymer, and is not especially limited.

Incidentally, the above methyl alcohol, polyalkylene glycols (e.g. polyethylene glycol), etc., which are used as polymerization initiators in the present invention, are distinguished from the terminal end stabilizer as used in the present invention. That is to say, if the polymerization initiators, such as methyl alcohol and polyalkylene glycols, are used, they structurally block one terminal end of the polymer and apparently serve as if they were terminal end stabilizers, but this blocking is made upon only one side terminal end, therefore the above polymerization initiators are different from what stabilizes both terminal ends of the polymer like the terminal end stabilizer as used in the present invention.

As to polymerization catalysts, those which selectively contribute to the polymerization of the glyoxylic acid ester are favorable, and basic ones are suitable. In other words, it is more favorable to anionically polymerize the above monomer component. The basic catalyst is not especially limited, but examples thereof include: alkaline metal hydroxides, such as sodium hydroxide and potassium hydroxide; alkaline metal alkoxides; amines; pyridine; 2-hydroxypyridine-$H_2O$ complex; and sodium monomethyl malonate; and of them, particularly, amines, pyridine, and 2-hydroxypyridine.$H_2O$ complex are preferable. These basic catalysts can be used either alone respectively or in combinations with each other. The amount of the polymerization catalyst as used may be adjusted according to such as molecular weight of the desired glyoxylic acid-based polymer, and is not especially limited.

Specific examples of usable polymerization methods include: a method which comprises the steps of charging the monomer component into a reactor together with the polymerization initiator, catalyst, or solvent all at once, and then carrying out the polymerization; and a method which comprises the steps of charging the polymerization initiator, catalyst, or solvent into a reactor, and then carrying out the polymerization while successively adding (for example, dropwise adding) the monomer component into the reactor. However, the polymerization method is not especially limited.

The polymerization conditions such as polymerization temperature and polymerization time are not especially limited, but the polymerization temperature is more favorably adjusted in the range of −50 to 50° C. because the polymerization is an exothermic reaction. In addition, in the final stage of the polymerization, it is more favorable that the polymerization temperature is adjusted in the range of −30 to 30° C. The polymerization time may fitly be adjusted according to such as polymerization temperature. In addition, because the glyoxylic acid ester easily reacts with oxygen or water, it is desirable to carry out the above polymerization in the absence of oxygen or water, in other words, under an inert gas atmosphere such as nitrogen gas. Furthermore, it is desirable that all steps for producing the glyoxylic acid-based polymer are carried out under the inert gas atmosphere. Incidentally, the polymerization may be carried out under normal (atmospheric) pressure, but can also be carried out under reduced or increased pressure.

The above polymerization can give the glyoxylic acid-based polymer in a state of a solution in which the glyoxylic acid-based polymer is dissolved in the solvent. The molecular weight of the glyoxylic acid-based polymer is not especially limited, but may be set according to its uses. For example, when the glyoxylic acid (salt)-based polymer is used as a detergent builder, the degree of polymerization of the glyoxylic acid ester is favorably in the range of 5 to 1,000, more favorably 15 to 300, because the dissolution rate of the polymer in water might not reach a desirable value.

Terminal End Stabilization by Addition of Catalyst

The glyoxylic acid-based polymer, which is obtained by polymerizing the monomer component including the glyoxylic acid-based monomer such as glyoxylic acid ester, has unstable terminal end portions because the main chain of this polymer has an acetal structure. Accordingly, in the case where, in order to isolate the glyoxylic acid-based polymer, a reaction liquid containing the polymer is for example heated to remove a solvent etc. therefrom, the main chain is cut off from the terminal end portions of the polymer, so that the polymer decomposes (depolymerizes). In other words, it is impossible to isolate or purify the glyoxylic acid-based polymer stably in a high yield. Therefore, the isolation of the glyoxylic acid-based polymer needs the stabilization of the terminal end portions of the glyoxylic acid-based polymer.

The method for the terminal end stabilization in the production process according to the present invention is carried out by adding a catalyst, having a function different from that of a catalyst as used for the polymerization reaction, into the reaction system of the aforementioned polymerization reaction. In other words, the essential terminal-end-stabilizing reaction is caused by adding the aforementioned catalyst to the terminal end stabilizer which is used as a reaction medium during the polymerization.

The catalyst as used for the terminal-end-stabilizing reaction is preferably an acid catalyst. Specific examples thereof include: protonic acids, such as halogenated hydrogens (e.g. hydrochloric acid), hydrobromic acid, hydroiodic acid, trifluoroacetic acid, and phosphoric acid; Lewis acids, such as metal halides (e.g. aluminum chloride) and organoaluminum compounds (e.g. alkylaluminum halides, trialkylaluminum); but are not especially limited. These acid catalysts can be used either alone respectively or in combinations with each other. Incidentally, it is also possible that the acid catalyst is used for the reaction in a state of a solution obtained by dissolving it into aliphatic hydrocarbons such as hexane, if necessary.

The amount of the acid catalyst as used relative to the glyoxylic acid-based polymer or terminal-end-stabilizing compound may be set according to such as the kind of the acid catalyst, the combinations with the glyoxylic acid-based polymer or terminal-end-stabilizing compound, or the molecular weight of the glyoxylic acid-based polymer, and is not especially limited. However, the solution of the glyoxylic acid-based polymer contains a basic substance B such as the polymerization catalyst as used for the polymerization. Therefore, it is necessary to use the acid catalyst in an amount larger than that required for neutralizing these basic substances B.

The preferred amount of the above acid catalyst as used is favorably in the range of 1.1 to 200 mols, more favorably 1.5 to 100 mols, still more favorably 2 to 50 mols, per 1 mol of the basic substance present in the reaction system.

The reaction conditions for the reaction of the terminal end stabilizer are not especially limited, but the reaction temperature is favorably in the range of −50 to 50° C., more favorably −30 to 40° C., particularly favorably −20 to 35° C. The reaction time may fitly be adjusted according to such as reaction temperature. In addition, it is desirable to carry out the above reaction in the absence of oxygen or water, in other words, under an inert gas atmosphere such as nitrogen gas. Furthermore, it is desirable that all steps for stabilizing the glyoxylic acid-based polymer are carried out under the inert gas atmosphere. Incidentally, the reaction may be carried out under normal (atmospheric) pressure, but can also be carried out under reduced or increased pressure.

The above addition reaction introduces the terminal end stabilizer into the glyoxylic acid-based polymer as terminal end groups thereof, and thereby stabilizes this polymer.

In the production process according to the present invention, if necessary, acid substances which remain in the system may be deactivated by adding a basic compound A after the terminal-end-stabilizing reaction has been carried out by adding the above acid catalyst.

Examples of the above basic compound A include: alkaline metal hydroxides, such as sodium hydroxide and potassium hydroxide; alkaline metal alkoxides; alkaline metal carbonates; and amines; but are not especially limited. Specific examples of the above amines include: aliphatic amines, such as ethylamine, n-propylamine, isopropylamine, n-butylamine, sec-butylamine, t-butylamine, dodecylamine, octadecylamine, dimethylamine, diethylamine, dipropylamine, triethylamine, N,N-dimethyldodecylamine, cyclohexylamine, and dicyclohexylamine; allylamine; aromatic amines, such as benzylamine and aniline; pyridine; alkanolamines, such as monoethanolamine, diethanolamine, and triethanolamine; but are not especially limited. These basic compounds A can be used either alone respectively or in combinations with each other.

Of the above-exemplified basic compounds A, the amines are more favorable. In addition, more favorable ones of the above-exemplified amines are those which have a boiling point of not lower than 80° C., still more favorably not lower than 100° C., particularly favorably not lower than 120° C. In addition, the alkanolamines are still more favorable. The tertiary amines are particularly favorable because such amines become less colored. Triethanolamine is the most favorable because it is more excellent in safety and is more odorless.

The amount of the basic compound A as used relative to the acid catalyst may be set according to such as kinds or combinations of both, and is not especially limited. However, it is more favorable to add the basic compound A in an amount of 10 to 200 mol %, more favorably 50 to 150 mol %, of the acid catalyst (as added during the reaction) into the reaction system, that is, reaction liquid (addition reaction mixture). Thereby, the acid catalyst as contained in the reaction liquid can be deactivated. Incidentally, the acid catalyst is consumed in some degree during the addition reaction. Therefore, even though an equivalent mol of basic compound A is not added to the initially added acid catalyst, it might be possible to achieve the deactivation of the acid catalyst.

Terminal-End-Stabilized Glyoxylic Acid-Based Polymer

The method for isolating or purifying the stabilized glyoxylic acid-based polymer is not especially limited.

The terminal-end-stabilized glyoxylic acid-based polymer, obtained by the production process according to the present invention, is very excellent in respect to safety and environmental pollution, because the organic solvent, such as halogenated hydrocarbon having high toxicity, substantially does not remain in the polymer. Furthermore, the polymer, obtained by the production process according to the present invention, contains only an extremely small amount of residual solvent, and the case where the solvent substantially does not remain in the polymer is also realizable. Therefore, there are advantages of increasing the purity of the polymer.

Terminal-End-Stabilized Glyoxylic Acid Salt-Based Polymer

In the production process according to the present invention, the glyoxylic acid-based polymer may be saponified (hydrolyzed) in order to convert it into a glyoxylic acid salt-based polymer, if necessary. In other words, the glyoxylic acid-based polymer, as stabilized by the above method, can be saponified (hydrolyzed) by using strongly basic and water-soluble metal hydroxides, specifically, mono-, di-, and trivalent metal hydroxides such as alkaline metal hydroxides and alkaline earth metal hydroxides. The saponification of the glyoxylic acid-based polymer, for example, can afford water solubility to the polymer (convert the polymer into a water-soluble one).

Examples of the above alkaline metal hydroxides include lithium hydroxide, sodium hydroxide, and potassium hydroxide. Examples of the above alkaline earth metal hydroxides include magnesium hydroxide and calcium hydroxide. These metal hydroxides can be used either alone respectively or in combinations with each other. Of the above-exemplified metal hydroxides, sodium hydroxide and potassium hydroxide are more favorable, and sodium hydroxide is particularly favorable, for the case where the glyoxylic acid salt-based polymer is, for example, used as a detergent builder. It is desirable that the amount of the metal hydroxide as used relative to the glyoxylic acid-based polymer is excessive by about 5 to about 50 % of the theoretical amount.

The reaction method for the saponification is not especially limited, but a preferable method comprises the step of carrying out the saponification by all at once or successively (e.g. dropwise) adding an aqueous solution of the metal hydroxide into the glyoxylic acid-based polymer as stabilized by the aforementioned method. In addition, when carrying out the saponification, water may beforehand be added to the glyoxylic acid-based polymer, if necessary. Incidentally, the concentration of the above aqueous solution and the amount of water as added are not especially limited. In addition, the saponification can be carried out also in a state of the reaction liquid (addition reaction mixture) without isolating the glyoxylic acid-based polymer, if necessary.

The reaction conditions for the saponification are not especially limited, but the reaction temperature is more favorably in the range of 35 to 75° C., still more favorably 45 to 65° C. The reaction time may fitly be adjusted according to such as reaction temperature. Incidentally, the saponification may be carried out under normal (atmospheric) pressure, but can also be carried out under reduced or increased pressure.

A metal salt of the glyoxylic acid-based polymer, namely, the glyoxylic acid salt-based polymer, is obtained in a state of a solution, slurry or gel by the above saponification (hydrolysis). It is desirable to maintain the pH of the reaction liquid at a value of larger than 9.5, more favorably larger than 10.0, after the saponification.

The method for isolating or purifying the glyoxylic acid salt-based polymer, for specific example, may be carried out by heating the reaction liquid containing the polymer in order to remove such as alcohols as side-produced by the saponification, but the method is not especially limited. Thereby, the glyoxylic acid salt-based polymer can be isolated or purified stably in a high yield in a state of a dry solid or wet cake. The glyoxylic acid salt-based polymer can favorably be used, for example, for detergent builders, chelating agents, complexing agents, sequestering agents, and various dispersants. Specific examples thereof are shown below.

In addition, the terminal-end-stabilized glyoxylic acid salt-based polymer, obtained by the production process according to the present invention, is very excellent in respect to safety and environmental pollution, because the organic solvent, such as halogenated hydrocarbon having high toxicity, substantially does not remain in the polymer.

In addition, as to the production process according to the present invention, in the case where the glyoxylic acid-based polymer is not isolated, more specifically, in the case where the solvent is not removed or recovered before carrying out the saponification, it is also possible that both the step of deactivating the acid catalyst by adding the basic compound A into the reaction liquid (addition reaction mixture) and the step of obtaining the glyoxylic acid salt-based polymer by saponifying (hydrolyzing) the glyoxylic acid-based polymer are carried out in one step. In other words, it is also possible that the deactivation of the acid catalyst and the saponification of the glyoxylic acid-based polymer are carried out in one step by using the metal hydroxide as the above basic compound A. The amount of the metal hydroxide (basic compound A), as used in this case, may be set considering the amount of the glyoxylic acid ester as charged for the polymerization and the amount of the acid catalyst as added for the addition reaction.

Uses

As is mentioned above, the terminal-end-stabilized glyoxylic acid (salt)-based polymer, as obtained by the production process according to the present invention, is a polymer in which the organic solvent, such as halogenated hydrocarbon having high toxicity, substantially does not remain, and which is very excellent in respect to safety and countermeasures against environmental pollution. Therefore, this polymer is favorably used particularly for such as detergent builders, detergent compositions, chelating agents, fiber-treating agents, chemicals for paper production, water-treating agents, pigment dispersants, adhesives, binders, and films.

Effects and Advantages of the Invention

The present invention can provide a production process for a terminal-end-stabilized glyoxylic acid (salt)-based polymer, which process enables to reduce the amount of the polymerization solvent, as recovered or removed after the end of the polymerization (before the start of the hydrolysis) or after the end of the hydrolysis, without lowering the production efficiency.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples.

EXAMPLE 1

A glass reactor, as equipped with a thermometer, a dropping funnel, a stirrer, a nitrogen-gas-introducing tube, and a reflux condenser, was charged with 3.5 ml of ethyl vinyl ether (as a solvent and a terminal end stabilizer), 0.2 ml of methyl alcohol (as a polymerization initiator), and 9 µl of pyridine (as a polymerization catalyst). On the other hand, crude methyl glyoxylate (as a glyoxylic acid ester) was purified by simple distillation. Then, 50 g of the purified methyl glyoxylate (monomer component) was charged into the dropping funnel.

Then, a polymerization was carried out by dropwise adding the methyl glyoxylate from the dropping funnel over a period of 30 minutes while stirring the contents of the reactor under nitrogen gas atmosphere. The (polymerization) temperature of the reaction liquid (contents of the reactor) was controlled to not higher than 40° C. by fitly cooling the reactor in the period of the dropwise addition. After the dropwise addition had finished, the resultant reaction liquid was cooled to 25° C., thus obtaining a solution of a poly(methyl glyoxylate) as a glyoxylic acid-based polymer (reaction mixture).

Next, while stirring the above reaction liquid under nitrogen atmosphere, 0.05 g of triethylaluminum (as an acid catalyst) was added into the reaction liquid in order to carry out an addition reaction. After the addition of the triethylaluminum had finished, the (reaction) temperature of the reaction liquid (contents of the reactor) was controlled to about 30° C. by fitly cooling the reactor, while the reaction liquid was stirred for 4 hours, thus obtaining a poly(methyl glyoxylate) as terminal-end-stabilized by ethyl vinyl ether (addition reaction mixture).

Subsequently, a 48 weight % aqueous sodium hydroxide (metal hydroxide) solution was added into this solution, and then the resultant mixture was stirred, thereby carrying out a saponification of the poly(methyl glyoxylate). The amount of the sodium hydroxide as used was set so that its molar ratio to the above methyl glyoxylate would be 1.1, thus obtaining an aqueous solution of a poly(sodium glyoxylate) as a glyoxylic acid salt-based polymer according to the present invention.

Volatiles including methyl alcohol, as formed by the saponification, were distilled off from the resultant aqueous poly(sodium glyoxylate) solution under conditions of vacuum degree=400 hPa (300 mmHg) and temperature=50° C. with an evaporator over a period of 30 minutes.

The resultant aqueous poly(sodium glyoxylate) solution was analyzed by GPC (gel permeation chromatography) in order to calculate the polymer yield from its area ratio. As a result, the polymer yield was 93 weight %.

EXAMPLE 2

A poly(sodium glyoxylate) was obtained by the same reaction and procedure as of Example 1 except to use 16.5 ml of ethyl vinyl ether (as the solvent and the terminal end stabilizer) and 0.2 g of triethylaluminum (as the acid catalyst). The polymer yield, as determined in the same way as of Example 1, was 95 weight %.

EXAMPLE 3

A poly(sodium glyoxylate), as terminal-end-stabilized by propylene oxide, was obtained by the same reaction and procedure as of Example 1 except to replace the ethyl vinyl ether with 12 ml of propylene oxide (as the solvent and the terminal end stabilizer) and the triethylaluminum with 0.17 g of trifluoroborate etherate (as the acid catalyst). The polymer yield, as determined in the same way as of Example 1, was 60 weight %.

EXAMPLE 4

A glass reactor, as equipped with a thermometer, a dropping funnel, a stirrer, a nitrogen-gas-introducing tube, and a reflux condenser, was charged with 13 ml of propylene oxide (as a solvent and a terminal end stabilizer), 0.1 ml of methyl alcohol (as a polymerization initiator), and 7 µl of pyridine (as a polymerization catalyst). On the other hand, crude methyl glyoxylate (as a glyoxylic acid ester) was purified by simple distillation. Then, 60 g of the purified methyl glyoxylate (monomer component) was charged into the dropping funnel.

Then, a polymerization was carried out by dropwise adding the methyl glyoxylate from the dropping funnel over a period of 30 minutes while stirring the contents of the reactor under nitrogen gas atmosphere. The (polymerization) temperature of the reaction liquid (contents of the reactor) was controlled to not higher than 40° C. by fitly cooling the reactor in the period of the dropwise addition. After the dropwise addition had finished, the resultant reaction liquid was cooled to 25° C., thus obtaining a solution of a poly(methyl glyoxylate) as a glyoxylic acid-based polymer (reaction mixture).

Next, while stirring the above reaction liquid under nitrogen atmosphere, 0.1 g of trifluoroborate etherate (as an acid catalyst) was added into the reaction liquid, and the resultant reaction liquid was then stirred for 30 minutes in order to carry out an addition reaction. During the addition reaction, the (reaction) temperature of the reaction liquid (contents of the reactor) was controlled to about 30° C. by fitly cooling the reactor.

Furthermore, 4 ml of ethyl vinyl ether (as a terminal end stabilizer) was added into the above reaction liquid, and the resultant reaction liquid was then stirred for 5 minutes in order to entirely dissolve the ethyl vinyl ether.

Then, while stirring the above reaction liquid under nitrogen atmosphere, 0.05 g of triethylaluminum (as an acid catalyst) was added into the reaction liquid in order to further carry out an addition reaction. After the addition of the triethylaluminum had finished, the (reaction) temperature of the reaction liquid (contents of the reactor) was controlled to about 30° C. by fitly cooling the reactor, while the reaction liquid was stirred for 4 hours, thus obtaining a poly(methyl glyoxylate) as terminal-end-stabilized by propylene oxide and ethyl vinyl ether (addition reaction mixture).

Subsequently, a saponification of the poly(methyl glyoxylate) was carried out by the same procedure as of Example 1, thus obtaining an aqueous solution of a poly(sodium glyoxylate) as a glyoxylic acid salt-based polymer.

The polymer yield, as determined in the same way as of Example 1, was 90 weight %.

EXAMPLE 5

A polymerization was carried out in the same way as of Example 4 except that the amount of the purified methyl glyoxylate, as charged into the dropping funnel, was reduced to 54 g and that 6 g of methyl acetate was used as an organic solvent by also charging it into the glass reactor (total of methyl glyoxylate and methyl acetate: 60 g)

The polymer yield, as determined in the same way as of Example 1, was 80 weight %.

COMPARATIVE EXAMPLE 1

The same glass reactor as that used in Example 1 was charged with 10 ml of methylene chloride (as a conventional solvent), 0.2 ml of methyl alcohol (as a polymerization initiator), and 9 µl of pyridine (as a polymerization catalyst).

On the other hand, crude methyl glyoxylate (as a glyoxylic acid ester) was purified by simple distillation. Then, 50 g of the purified methyl glyoxylate (monomer component) was charged into the dropping funnel.

Then, a polymerization was carried out by dropwise adding the methyl glyoxylate from the dropping funnel over a period of 30 minutes while stirring the contents of the reactor under nitrogen gas atmosphere. The (polymerization) temperature of the reaction liquid (contents of the reactor) was controlled to not higher than 40° C. by fitly cooling the reactor in the period of the dropwise addition. After the dropwise addition had finished, the resultant reaction liquid was cooled to 25° C., thus obtaining a solution of a poly(methyl glyoxylate) as a glyoxylic acid-based polymer (reaction mixture).

Next, while stirring the above reaction liquid under nitrogen atmosphere, 0.05 g of triethylalurninum (as an acid catalyst) was added into the reaction liquid, and the resultant reaction liquid was then stirred for 5 minutes in order to entirely dissolve the triethylaluminum. On the other hand, the dropping funnel was charged with 3.5 ml of ethyl vinyl ether (as a terminal end stabilizer).

Then, an addition reaction was carried out by dropwise adding the ethyl vinyl ether from the dropping funnel while stirring the reaction liquid of the reactor under nitrogen gas atmosphere. After the addition had finished, the (reaction) temperature of the reaction liquid (contents of the reactor) was controlled to about 30° C. by fitly cooling the reactor, while the reaction liquid was stirred for 4 hours, thus obtaining a poly(methyl glyoxylate) as terminal-end-stabilized by ethyl vinyl ether (addition reaction mixture).

Subsequently, the resultant mixture was dried at 50° C. under reduced pressure for 2 hours in order to remove the methylene chloride which was the solvent. Next, the resultant dry product was saponified by using a 48 weight % aqueous sodium hydroxide (metal hydroxide) solution, thus obtaining an aqueous solution of a poly(sodium glyoxylate).

Volatiles including methyl alcohol, as formed by the saponification, were distilled off from the resultant aqueous poly(sodium glyoxylate) solution under conditions of vacuum degree=400 hPa (300 mmHg) and temperature=50° C. with an evaporator over a period of 30 minutes. Then, the resultant aqueous solution was analyzed by GC (gas chromatography). As a result, the methylene chloride remained in the resultant aqueous solution in a ratio of 520 ppm. In addition, as a result of the same GPC analysis as of Example 1, the polymer yield was 83 weight %.

COMPARATIVE EXAMPLE 2

A poly(sodium glyoxylate), as terminal-end-stabilized by propylene oxide, was obtained by the same reaction and procedure as of Comparative Example 1 except to replace the ethyl vinyl ether with 12 ml of propylene oxide (as the terminal end stabilizer) and the triethylaluminum with 0.17 g of trifluoroborate etherate (as the acid catalyst). The polymer yield, as determined in the same way as of Example 1, was 55 weight %.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for a terminal-end-stabilized glyoxylic acid (salt)-based polymer, which comprises the steps of:
   (i) anionically polymerizing a monomer component including a glyoxylic acid ester in the presence of an anionic-polymerization initiator in an anionic-polymerization to obtain a terminal-end-unstabilized glyoxylic acid (salt)-based polymer having terminal ends, wherein a terminal end stabilizer is used as a reaction medium of the anionic-polymerization, and wherein the terminal end stabilizer is an alkylene oxide, then
   (ii) adding a terminal-end-stabilizing catalyst to react the terminal end stabilizer with the terminal ends of the terminal-end-unstabilized glyoxylic acid (salt)-based polymer to obtain a terminal-end-stabilized glyoxylic acid (salt)-based polymer.

2. A production process according to claim 1, wherein the anionic-polymerization is carried out in the presence of a basic polymerization catalyst.

3. A production process according to claim 1, wherein the terminal-end stabilizing catalyst is an acid catalyst.

4. A production process for a terminal-end-stabilized glyoxylic acid (salt)-based polymer, which comprises the steps of:
   (i) anionically polymerizing a monomer component including a glyoxylic acid ester in the presence of an anionic-polymerization initiator in an anionic-polymerization to obtain a terminal-end-unstabilized glyoxylic acid (salt)-based polymer having terminal ends, wherein a terminal end stabilizer is used as a reaction medium of the anionic-polymerization, and wherein the terminal end stabilizer is an alkylene oxide, wherein the anionic-polymerization is carried out in the presence of a basic polymerization catalyst, then
   (ii) adding a terminal-end-stabilizing catalyst to react the terminal end stabilizer with the terminal ends of the terminal-end-unstabilized glyoxylic acid (salt)-based polymer to obtain a terminal-end-stabilized glyoxylic acid (salt)-based polymer, wherein the terminal-end stabilizing catalyst is an acid catalyst.

* * * * *